United States Patent [19]

Ura et al.

[11] Patent Number: 4,643,136

[45] Date of Patent: Feb. 17, 1987

[54] INLET SYSTEM FOR INTERNAL COMBUSTION ENGINE

[75] Inventors: Shozabu Ura, Fujisawa; Yoshio Iwasa, Nagareyama, both of Japan

[73] Assignee: Nissan Motor Co., Ltd., Yokohama, Japan

[21] Appl. No.: 611,438

[22] Filed: May 17, 1984

[30] Foreign Application Priority Data

May 19, 1983 [JP] Japan ................................ 58-88163

[51] Int. Cl.⁴ .............................................. F02B 3/00
[52] U.S. Cl. .................................. 123/52 M; 123/432; 123/302
[58] Field of Search ......... 123/52 M, 52 MB, 52 MC, 123/306, 308, 302, 432

[56] References Cited

U.S. PATENT DOCUMENTS

| | | | |
|---|---|---|---|
| 4,232,640 | 11/1980 | Matsumoto et al. | 123/308 |
| 4,244,333 | 1/1981 | Matsumoto | 123/52 M |
| 4,265,207 | 5/1981 | Hayashida | 123/432 |
| 4,276,862 | 7/1981 | Matsumoto | 123/52 M |
| 4,303,046 | 12/1981 | Nakawishi et al. | 123/432 |
| 4,304,211 | 12/1981 | Tezuka et al. | 123/432 |
| 4,308,837 | 1/1982 | Nohira et al. | 123/52 M |
| 4,411,226 | 10/1983 | Okumura et al. | 123/308 |
| 4,445,480 | 5/1984 | Inoue et al. | 123/308 |
| 4,470,391 | 9/1984 | Ishida | 123/306 |
| 4,528,958 | 7/1985 | Yoshida et al. | 123/52 M |

FOREIGN PATENT DOCUMENTS

| | | | |
|---|---|---|---|
| 2339356 | 3/1975 | Fed. Rep. of Germany | 123/52 M |
| 2824205 | 12/1979 | Fed. Rep. of Germany | 123/52 M |
| 0036228 | 3/1977 | Japan | 123/432 |
| 0075531 | 6/1980 | Japan | 123/52 MB |
| 56-105626 | 8/1981 | Japan | . |
| 0070947 | 5/1982 | Japan | 123/52 M |
| 0181963 | 11/1982 | Japan | 123/52 M |
| 0212359 | 12/1982 | Japan | 123/52 M |
| 0062317 | 4/1983 | Japan | 123/52 M |
| 0119958 | 7/1983 | Japan | 123/52 M |
| 0131312 | 8/1983 | Japan | 123/52 M |

*Primary Examiner*—Charles J. Myhre
*Assistant Examiner*—David A. Okonsky
*Attorney, Agent, or Firm*—Schwartz, Jeffery, Schwaab, Mack, Blumenthal & Evans

[57] ABSTRACT

An inlet system for an internal combustion engine comprises a plurality of auxiliary inlet passageways which curve and extend outwardly of a plurality of mating main inlet passageways and joining with the main inlet passageways, respectively, at an acute angle at their downstream portions.

9 Claims, 5 Drawing Figures

INLET SYSTEM FOR INTERNAL COMBUSTION ENGINE

BACKGROUND OF THE INVENTION

The present invention relates to an inlet system for an internal combustion engine.

As is well known to those skilled in the art, it is during operation within a relatively narrow engine speed range, which range is determined by a flow cross sectional area and a length of an inlet passageway, that the admission of intake air by suction to each of cylinders of an engine is effective.

According to a prior art inlet system disclosed in Japanese Utility Model Provisional Publication No. 56-105626, there are arranged between a surge tank and a cylinder head 22 a main inlet passageway 23 and an auxiliary inlet passageway 24, as shown in FIG. 1, in order to charge each of cylinders of an engine. The flow cross sectional area and the length of the main inlet passageway 23 are adjusted to optimize operation of the engine at a relatively high engine speeds, and those of the auxiliary inlet passageway 24 are adjusted to optimize operation at relatively low engine speeds. A control valve 25 is provided in the main inlet passageway 23, which valve is closed or opened to admit intake air through the main intlet passageway 23 or through the auxiliary inlet passageway 24 in order to improve the intake efficiency over a wide operating range of the engine.

However, according to this prior art inlet system, since the auxiliary inlet passageway 24 joins with the mating main inlet passageway 23 at generally right angles, the flow resistance at the junction is large. This makes it difficult to attain sufficiently increased power output during operation at low engine speeds where the auxiliary inlet passageway 24 only is put into operation. Another drawback with this prior art inlet system is in that it is difficult to form each of the auxiliary inlet passageways sufficiently long because of the fact that each of the main inlet passageways 23 and the mating one of the auxiliary inlet passageways 24 are formed as an integral unit by casting.

SUMMARY OF THE INVENTION

An object of the present invention is to provide a compact inlet system wherein each of auxiliary inlet passageways has a sufficienly long length and joins with the mating one of main inlet passageways smoothly in order to ensure smooth flow of intake air at a junction.

According to the present invention, an inlet system for an internal combustion engine comprises a plurality of main inlet passageways connected to a surge tank and a plurality, corresponding in number to the main inlet passageways, of auxiliary inlet passageways connected to the surge tank, each being curved and extending outwardly of the mating one of the main inlet passageways. In order to ensure smooth flow of intake air, each of the auxiliary inlet passageways joins with the mating one of the main inlet passageways at an acute angle.

DETAILED DESCRIPTION OF THE INVENTION

Figure 1:
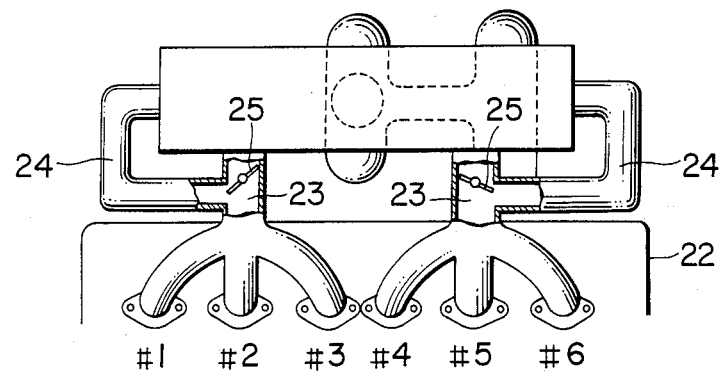
FIG. 1 is a schematic view of the prior art inlet system.
Figure 2:
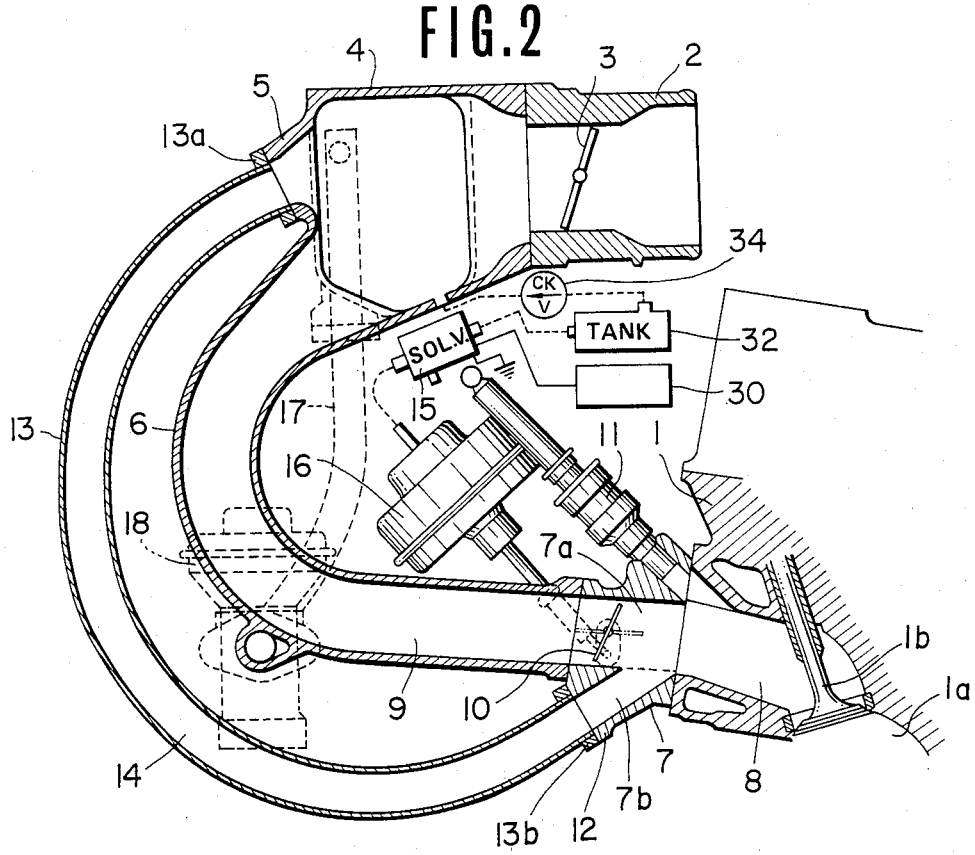
FIG. 2 is a section taken longitudinally along one of main inlet passageways and the mating one of auxiliary inlet passageways of a first embodiment of an inlet system according to the present invention as applied to a six-cylinder in-line internal combustion engine.
Figure 3:
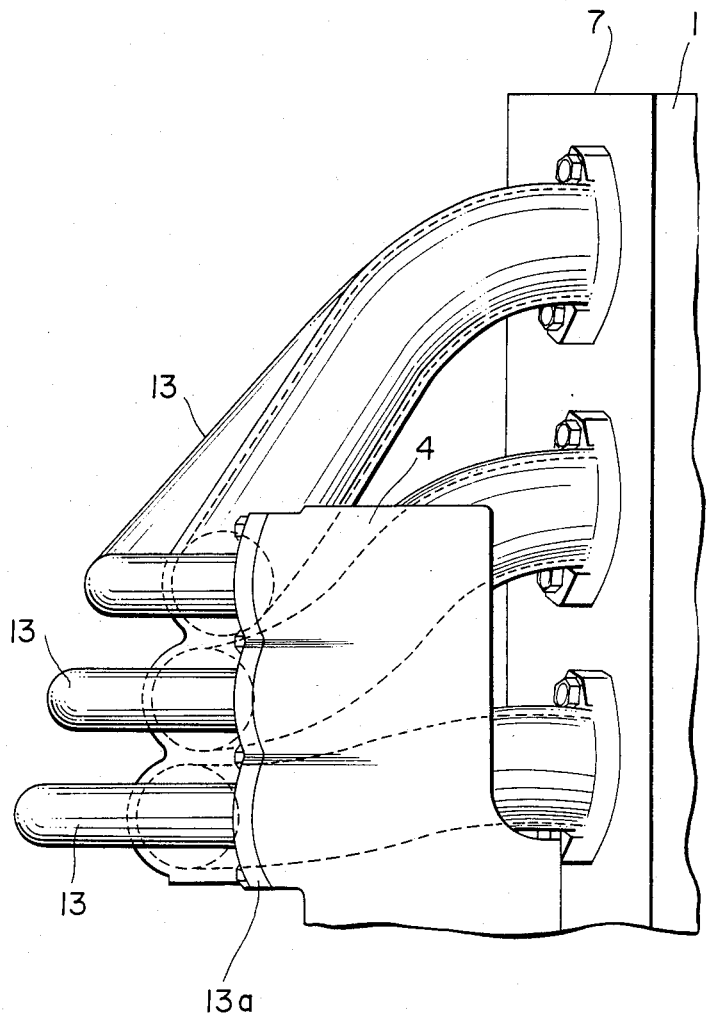
FIG. 3 is a schematic plan view of a half portion of the inlet system as viewed from the above in FIG. 2, showing a layout of tubes, the other half being a mirror image thereof.

Referring to FIGS. 2 and 3, the first embodiment of an inlet system according to the present invention is described. Although, in this embodiment, the inlet system is applied to a six-cylinder in-line internal combustion engine having a cylinder head 1, it may be applied to any internal combustion engine. The internal combustion engine has six cylinders each having therein a reciprocal piston which defines a combustion chamber, only one of the combustion chambers being shown at 1a in FIG. 2. Each of the combustion chambers is provided with an inlet valve and an exhaust valve, only one of the inlet valves being shown at 1b in FIG. 2. Referring to FIG. 2, the reference numeral 2 designates a throttle chamber provided with a throttle valve 3, and the reference numeral 4 designates a surge tank disposed to the side of the cylinder head 1 within an area slightly above the cylinder head 1.

The surge tank 4 is formed with two boss sections, only one being shown at 5, within an upper area on the lateral side thereof. Each of the boss sections 5 has formed therethrough three openings. The surge tank 4 is integrally formed with a plurality, six in this embodiment, of tubes 6 by casting. Each of the tubes 6 defines a main part of one of main inlet passageways 9, and is curved in a generally U-shape as viewed in FIG. 2, i.e., as viewed from the longitudinal end of the cylinder head 1. The tubes 6 extending from the surge tank 4 have opposite ends thereof communicable with the combustion chambers 1a of the engine, respectively, via the respective inlet valves 1b. The tubes 6 may be formed as separate pieces from the surge tank 4 to be secured to same by means of bolts and the like.

Connected betweeen the opposite ends of the tubes 6 and the cylinder head 1 is a control valve housing 7 having formed therethrough the corresponding number, six in this embodiment, of main passage portions 7a and the corresponding number, six in this embodiment, of auxiliary passage portions 7b. Each of the tubes 6, the mating one of the main passage portion 7a of the control valve housing 7 and the mating one of inlet ducts 8 formed through the cylinder head 1 cooperate with each other to define one of the main inlet passageways 9 through which intake air is admitted to the corresponding one of the combustion chambers 1a.

Mounted within the control valve housing 7 are a plurality, six in this embodiment, of control valves 10 each disposed in one of the main passage portions 7a. Fuel injectors 11 are mounted to the control valve housing 7, each directing fuel into one of the inlet ducts 8.

A plurality, six in this embodiment, of thin walled tubes 13 have one ends connected to the boss section 5 of the surge tank 4 and opposite ends connected to a boss section 12 of the control valve housing 7. Each of the tubes 13 mates with one of the tubes 6 and is curved in a generally U-shape and extends outwardly around the outer periphery of the mating one of the tubes 6. Each of these thin walled tubes 13, the mating one of the auxiliary passage portions 7b, and the mating one of the inlet ducts 8 cooperate with each other to define one of auxiliary inlet passageways 14. Within the control valve housing 7, each of the auxiliary passage portions 7b joins with the mating one of the main passage portions 7a at an acute angle. That is, each of the auxiliary inlet passageways 14 joins with the mating one of the main inlet passageways 9 at an acute angle as seen in FIG. 2. Alternatively, as shown in the second embodiment in FIG. 4, each of auxiliary inlet passageways 14' joins with the mating one of main inlet passageways 9' at an acute angle within one of inlet ducts 8'.

Figure 4:
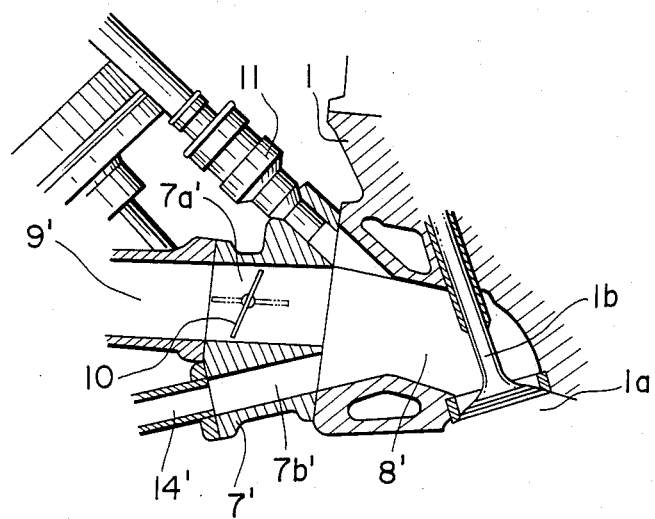
FIG. 4 is a portion of a similar section to FIG. 2 showing a portion of a second embodiment of an inlet system according to the present invention.

Referring to the second embodiment shown in FIG. 4, each of main passage portions 7a' does not join with the mating one of auxiliary passage portions 7b' within a control valve housing 7' and they are separated. Thus, the mouth of each of the inlet ducts 8' is slightly enlarged to connect with the main and auxiliary passage portions 7a' and 7b'.

The length of each the main inlet passageways 9 is relatively short and the flow cross sectional area thereof is relatively large in order to obtain good intake efficiency during engine operation at relatively high engine speeds ranging from 3500 to 6000 rpm, for example. The length of each of the auxiliary inlet passageways 14 is relatively long and the flow cross sectional area is relatively small in order to obtain good intake efficiency during engine operation at relatively low engine speeds ranging from 1000 to 3000 rpm.

Figure 5:
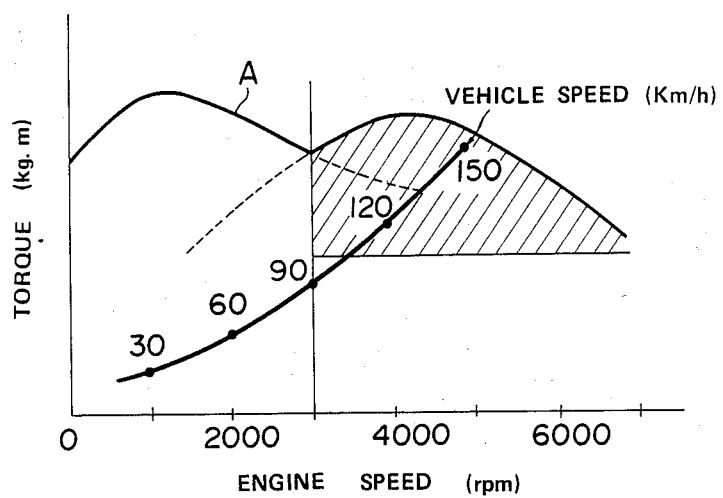
FIG. 5 shows torque vs. engine speed characteristics provided by the present invention.

Describing how the control valve 10 is actuated, a diaphragm type vacuum actuator 16 is provided having a three-way electromagnetic valve 15. The electromagnetic valve 15 selectively admits vacuum or atmospheric pressure to a vacuum chamber of the diaphragm type vacuum actuator 16 under the control of a control unit 30. Based on valve opening pulses fed to the fuel injectors 11, the control unit 30 decides engine speed and load to control the electromagnetic valve 15 in such a manner as to open each of the control valves 10 during engine operation at high speeds with heavy load. The control valves 10 are otherwise closed. As a result of this control, intake air flows mainly through the auxiliary inlet passageways 14 during engine operation at low and intermediate speeds as shown by the solid line drawn curve A in FIG. 5, providing an increased torque owing to the increased intake efficiency. During engine operation at high speeds with heavy load, intake air flows mainly through the main inlet passageways 9 as shown by the shadowed area in FIG. 5, providing the similar effect due to the increased intake efficiency.

Each of the control valves 10 is disposed in each of the main inlet passageways 9 immediately upstream of the junction with the mating one of the auxiliary inlet passageways 14 in order to reduce a dead space created between the valve 10 and the junction with the auxiliary inlet passageway 14 when the valve 10 is closed. Owing to this arrangement, the ill effect of the dead space on the intake efficiency during the low and intermediate engine speed operation range is minimized.

Referring back to FIG. 2, the reference numeral 17 designates an exhaust gas recirculation pipe for admitting the exhaust gas from the exhaust pipe, not shown, to the above mentioned surge tank 4, and the reference numeral 18 designates an exhaust gas recirculation valve. A group, three in this embodiment, of the above mentioned thin walled tubes 13 have one end formed in a common flange 13a and opposite ends formed in another common flange 13b. This integral tube structure is convenient in assembly. The electromagnetic valve 15 is connected with a vacuum tank 32 which communicates with the surge tank 4 via a one-way valve 34 so that even if the vacuum within the surge tank 4 drops, the actuator 16 can be reliably.

According to the inlet system constructed as above, since each of the auxiliary inlet passageways 14 joins with the mating one of the main inlet passageways 9 at the acute angle, a smooth air flow is obtained whichever passageway is selected as the flow path of the intake air, thus minimizing the flow resistance at the junction. Since each of the main inlet passageways 9 and the mating one of the auxiliary inlet passageways 14 are curved in a general U-shape and the auxiliary inlet passageways 14 are formed of separate thin walled tubes 13, the overall dimension of the inlet system has been reduced and the weight has been reduced, too. Further, it has been made possible to provide the auxiliary inlet passageways 14 which are sufficiently long and which can be easily manufactured. Furthermore, since the auxiliary inlet passageways 14 extend outwardly of the main inlet passageways 9, it is possible to provide the auxiliary inlet passageways 14 with relatively large curvature. Thus, even if the flow cross sectional area is small, the flow resistance through the auxiliary inlet passageways 14 do not increase.

As apparent from FIG. 2, each of the auxiliary inlet passageways 14 is so directed as to allow a stream of intake air therefrom to impinge at generally right angles with a stream of injected fuel from the fuel injector 11, thus facilitating the atomization of the fuel. Besides, the intake air passing through each of the auxiliary inlet passageways 14 flows along the upper side wall of each of the inlet ducts 8, resulting in generation of strong swirl in the cylinder. As a result, fuel economy is improved and exhaust purification is enhanced.

What is claimed is:

1. An inlet system for an internal combustion engine having a plurality of combustion chambers, comprising:
    means defining a throttle chamber;
    a throttle valve mounted within said throttle chamber;
    a surge tank communicating with and disposed downstreat of said throttle chamber;
    a plurality of main inlet passageways, each having a first end opening to said surge tank and an opposite second end communicable with one of the combustion chambers and each having a first flow cross sectional area;
    a plurality, corresponding in number to the number of said main inlet passageways, of auxiliary inlet passageways, each having a first end opening directly into and in constant communication with said surge tank and an opposite second end communicable with one of the combustion chambers,
    each of said auxiliary inlet passageways having a second flow cross sectional area smaller than said first flow cross sectional area;
    each of said auxiliary inlet passageways having said opposite second end opening to a respective one of said main inlet passageways at an acute angle;
    control valve means for closing each of said main inlet passageways; and
    means for supplying fuel to each of said main inlet passageways at a portion between said control valve means and said opposite second end of said each of main inlet passageways.

2. An inlet system as claimed in claim 1, wherein said plurality of auxiliary inlet passageways have said ends formed in a first common flange.

3. An inlet system as claimed in claim 1, wherein said control valve means includes a control valve housing formed with a plurality of main passage portions and a plurality of auxiliary passage portions, each joining with a respective one of said main passage portions; and wherein said control valve housing is connected to the tubes of said main inlet passageways and the tubes of said auxiliary inlet passageways.

4. An inlet system as claimed in claim 1, wherein said fuel supplying means includes a plurality of fuel injectors provided to direct injection of fuel in a predetermined direction into said main inlet passageways, respectively, and wherein the tubes of said auxiliary inlet passageways are so directed as to allow intake air therefrom to impinge at generally right angles with fuel injected from the fuel injectors.

5. An inlet system as claimed in claim 4, wherein the tubes of said auxiliary inlet passageways are so directed as to allow intake air therefrom to flow into the combustion chambers to generate a strong swirl in the combustion chambers.

6. An inlet system as claimed in claim 1, wherein
each of said main inlet passageways includes as a main part thereof a tube formed of casting having one end connected to said surge tank, and wherein
each of said auxiliary inlet passageways includes as a main part thereof a tube formed separate from said surge tank.

7. An inlet system as claimed in claim 6, wherein said tubes formed of casting are a casting integrally formed with said surge tank.

8. An inlet system as claimed in claim 6, wherein said control valve means includes a control valve housing formed with a plurality of main passage portions and a plurality of auxiliary passage portions, each being separate from a respective one of said main passage portions; and wherein said control valve housing is connected to the tubes of said main inlet passageways and the tubes of said auxiliary inlet passageways.

9. An inlet system as claimed in claim 8, where each of said auxiliary inlet passageways joins with a respective one of said main inlet passageways between said control valve housing and the plurality of combustion chambers.

* * * * *